US012766606B2

(12) United States Patent
Johansson et al.

(10) Patent No.: US 12,766,606 B2
(45) Date of Patent: Oct. 20, 2026

(54) METAL CUTTING TURNING TOOL

(71) Applicant: AB SANDVIK COROMANT, Sandviken (SE)

(72) Inventors: Adam Johansson, Sandviken (SE); Ronnie Lof, Sandviken (SE); Krister Wikblad, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 616 days.

(21) Appl. No.: 18/267,198

(22) PCT Filed: Nov. 3, 2021

(86) PCT No.: PCT/EP2021/080447
§ 371 (c)(1),
(2) Date: Jun. 14, 2023

(87) PCT Pub. No.: WO2022/128237
PCT Pub. Date: Jun. 23, 2022

(65) Prior Publication Data

US 2024/0051035 A1 Feb. 15, 2024

(30) Foreign Application Priority Data

Dec. 15, 2020 (EP) .................................... 20214127

(51) Int. Cl.
*B23B 27/16* (2006.01)
*B23B 1/00* (2006.01)

(52) U.S. Cl.
CPC ................ *B23B 27/16* (2013.01); *B23B 1/00* (2013.01)

(58) Field of Classification Search
CPC .... B23B 5/08; B23B 5/10; B23B 5/12; B23B 5/16; B23B 5/167; B23B 5/40;
(Continued)

(56) References Cited

U.S. PATENT DOCUMENTS 3,455,189 A * 7/1969 Sweet ..................... B23B 29/24 82/158
4,223,576 A * 9/1980 Donnelly ................ B23B 27/04 82/47

(Continued)

FOREIGN PATENT DOCUMENTS

CN 103203479 A * 7/2013 ......... B23B 27/1614
CN 104858457 A * 8/2015 ............. B23B 27/00

(Continued)

*Primary Examiner* — Nicole N Ramos
(74) *Attorney, Agent, or Firm* — Corinne R. Gorski

(57) ABSTRACT

A turning tool includes a coupling portion, which extends along a coupling axis defining a longitudinal axis of the turning tool, and a first and a second cutting element. The first cutting element has a first cutting edge and the second cutting element has a second cutting edge, which separates and connects a second forward cutting edge and a second rearward cutting edge. The first cutting element has a first top surface and the second cutting element has a second top surface. The first and second cutting elements intersect an imaginary circle or cylinder having a center axis thereof parallel to or coinciding with the coupling axis. The first cutting element is inclined in relation to the second cutting element by an inclination angle, which is measured around the center axis of the imaginary circle. The first top surface faces in a direction which is perpendicular to the coupling axis.

17 Claims, 4 Drawing Sheets

(58) Field of Classification Search
CPC .... B23B 5/46; B23B 1/00; B23B 3/26; B23B 3/265; B23B 3/36; B23B 29/043; B23B 29/04; B23B 2210/02; B23B 2220/12; B23B 2220/00; B23B 2220/44; B23B 2220/445; B23B 2220/40; B23B 2270/54
See application file for complete search history.

(56) References Cited

U.S. PATENT DOCUMENTS

| | | | | | |
|---|---|---|---|---|---|
| 5,653,152 | A * | 8/1997 | Oles | B23B 5/12 | 408/1 R |
| 7,086,315 | B1 * | 8/2006 | Beiser | B23B 29/24 | 82/99.1 |

FOREIGN PATENT DOCUMENTS

| | | | | | |
|---|---|---|---|---|---|
| DE | 10317344 | A1 * | 11/2004 | | B23P 13/00 |
| EP | 1317981 | A1 | 6/2003 | | |
| EP | 3025812 | A1 | 6/2016 | | |
| EP | 3536425 | A1 | 9/2019 | | |
| EP | 3560638 | A1 | 10/2019 | | |
| JP | 859201701 | A | 11/1984 | | |
| KR | 20060121472 | A * | 11/2006 | | B23D 13/005 |
| KR | 20200029698 | A | 3/2020 | | |
| KR | 20200031891 | A * | 3/2020 | | B23Q 37/00 |
| WO | WO-2004022288 | A2 * | 3/2004 | | B23B 29/242 |

* cited by examiner

Fig. 1
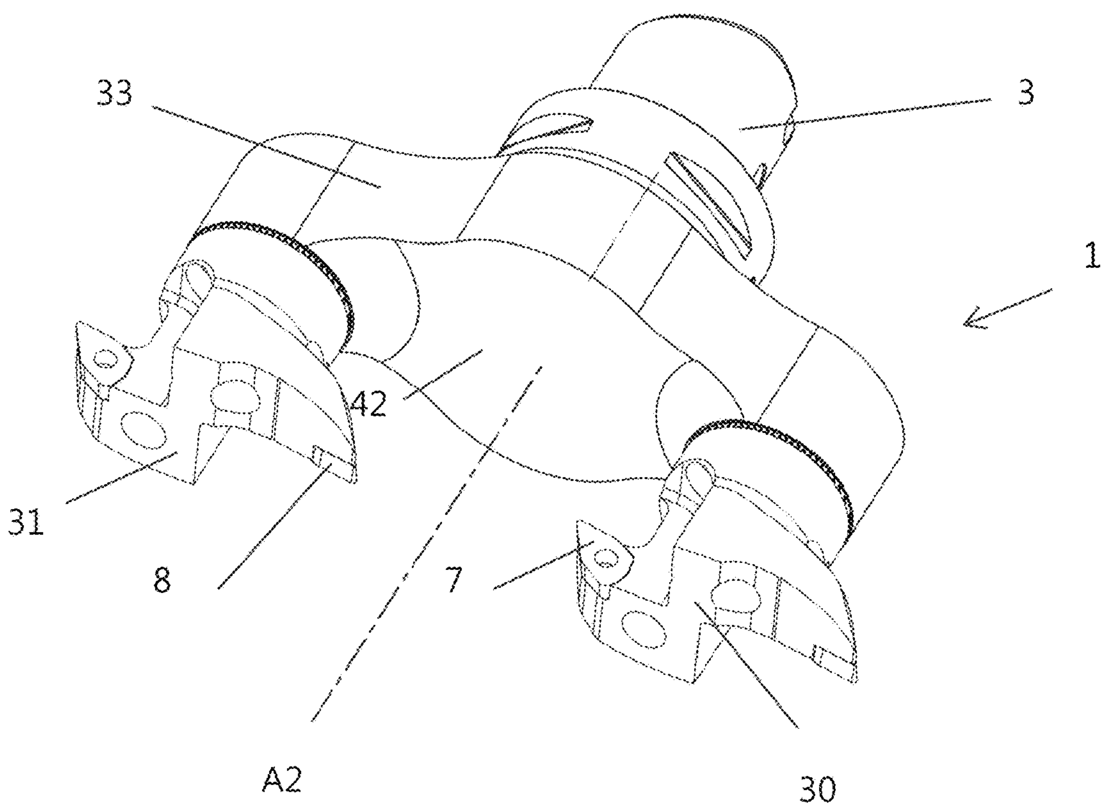
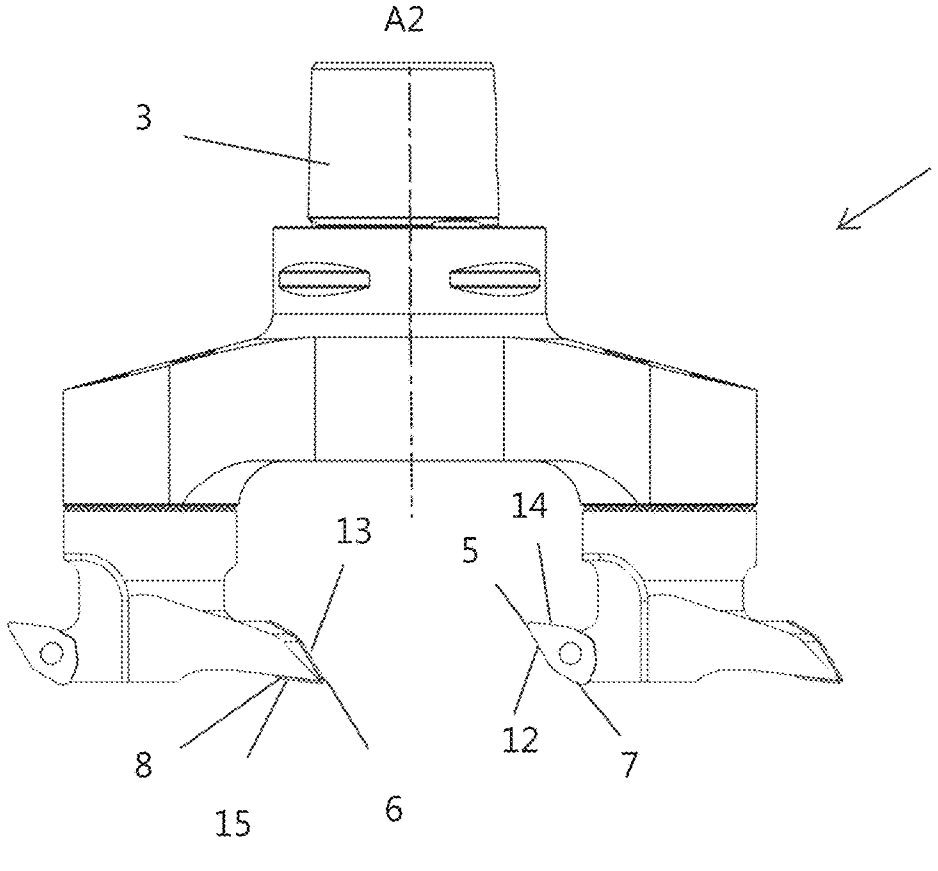
Fig. 2

Fig. 3
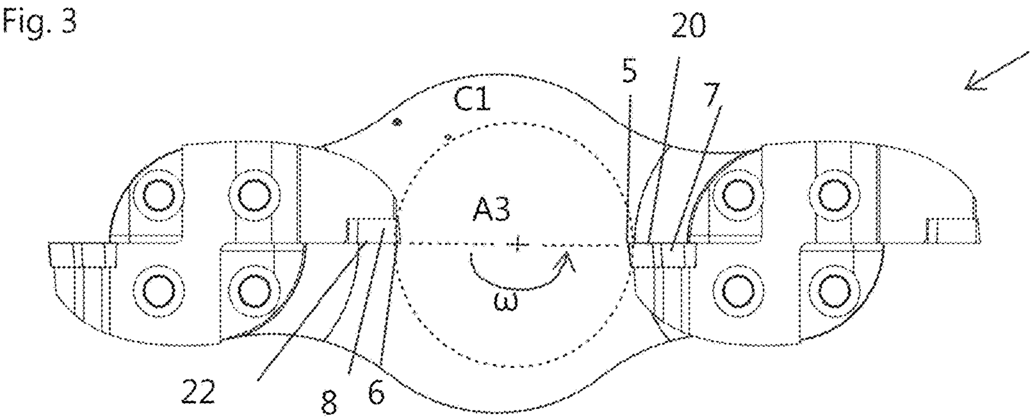
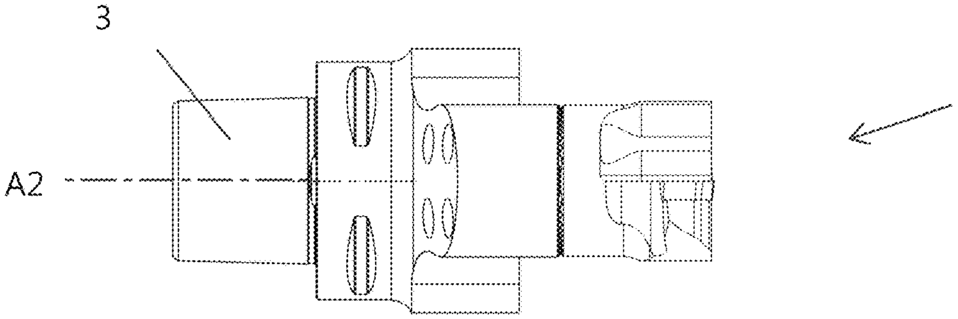
Fig. 4
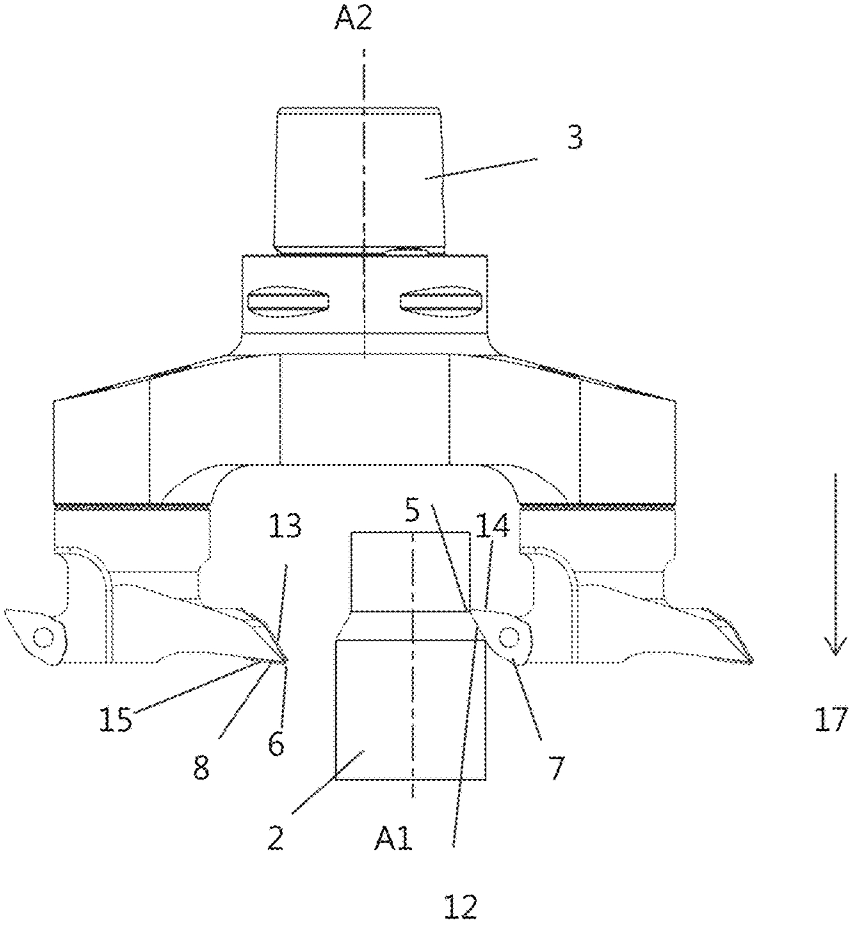
Fig. 5

METAL CUTTING TURNING TOOL

RELATED APPLICATION DATA

This application is a § 371 National Stage Application of PCT International Application No. PCT/EP2021/080447 filed Nov. 3, 2021 with priority to EP 20214127.1 filed Dec. 15, 2020.

TECHNICAL FIELD OF THE INVENTION

The present invention belongs to the technical field of metal cutting. More specifically the present invention belongs to the field of turning.

BACKGROUND OF THE INVENTION AND PRIOR ART

The present invention refers to a turning tool comprising a coupling portion, wherein the coupling portion extends along a coupling axis, the coupling axis defines a longitudinal axis of the turning tool, wherein the turning tool comprises a first cutting element and a second cutting element, wherein the first cutting element comprises a first cutting edge, wherein the second cutting element comprises a second nose cutting edge which separates and connects a second forward cutting edge and a second rearward cutting edge, wherein the first cutting element comprises a first top surface, wherein the second cutting element comprises a second top surface. In a further aspect, the present invention relates to a machining method for a CNC-lathe.

In metal cutting, turning is a common operation. CNC-lathes are commonly used. Normally, a complex shaped is machined from a metal work piece. To achieve the complex shape, it is common to use two or more turning tools, where the turning tools have different geometrical shape or different orientation. For example, one turning tool can be suitable in machining in one direction, and a second turning tool can be suitable to machining in a different direction.

Conventionally, each turning tool is equipped with one turning insert. After turning using one turning insert, normally the first turning tool is indexed to a second turning tool. For example, the CNC-lathe may comprise a turret, and the indexing from one turning tool to a second turning tool is achieved by rotation of the turret by a predetermined angle. Indexing by rotation of a turret takes time, depending e.g. on the CNC-lathe. The time where there is no cutting, such as when changing or indexing from one tool to another can be called down-time.

EP 1 317 981 A1 disclose a tool carrying a plurality of turning inserts, whereby switching between different turning inserts can be achieved quickly, by means of rotation of the turning tool around a coupling axis.

The inventors have found that there is a need for a further improved turning tool.

SUMMARY OF THE INVENTION

It is an object of the invention to provide a turning tool which suitable for machining an object having a complex shape. It is further an object to provide a turning tool which can be used on a wide range of CNC-lathes. A still further object is to provide a turning tool which can be used for a long time of machine. It is a yet further object to provide a turning tool which can help reduce the down-time.

At least one of said objectives is achieved by the initially defined turning tool, wherein the first and second cutting elements intersect an imaginary circle or cylinder having a center axis thereof parallel to or coinciding with the coupling axis, wherein the first cutting element is inclined in relation to the second cutting element by an inclination angle, wherein said inclination angle is measured around the center axis of the imaginary circle, wherein the first top surface is facing in a direction which is perpendicular to or substantially perpendicular to the coupling axis.

By such a turning tool a very quick change or indexing from a first cutting element to a second element can be achieved by a linear motion of the turning tool.

The turning tool is for a CNC-lathe i.e. a computer- or computerized numerical control lathe, i.e. any CNC-machine suitable for turning such as e.g. a turning lathe, a multitask machine, a turn-mill machine, or a sliding head machine. The turning tool is for machining a metal work piece, such as a metal work piece comprises an external surface, which is a radially outer surface, where the radially outer surface is facing away from a rotational axis around which the metal work piece is rotatable. The turning tool is for turning of said radially outer surface, i.e. external turning.

The turning tool comprises a forward end and an opposite rear end in the form of a coupling portion. The coupling portion is removably connectable to the CNC-lathe, more specifically to a machine interface of the CNC-lathe, such as a machine spindle or a tool revolver turret or a tool post.

The coupling portion may have a square or rectangular shape in a cross section. The coupling portion may be conical or substantially conical such as preferably according to ISO standard 26623-1.

The coupling portion extends along a coupling axis or a center axis, which center axis defines a longitudinal axis of the turning tool.

The turning tool comprises a first cutting element and a second cutting element. The first and second cutting elements are spaced apart. The first and second cutting elements are preferably cutting inserts or turning inserts, i.e. replaceable elements made from a wear resistant material, e.g. cemented carbide. Alternatively, the first and second cutting elements can be parts of a single wear resistant element, preferably made from a single piece of cemented carbide. The first cutting element comprises a first top surface. The first top surface comprises a rake face or a rake surface.

The first cutting element comprises a first cutting edge. The first cutting edge may preferably be in form of a nose cutting edge, i.e. a cutting edge which is convex in a top view. The first cutting edge, or a portion of the first cutting edge, generate the machined surface. The first cutting element may be in the form of a round cutting insert, i.e. an insert which is circular or substantially circular in a top view. The radius of said circle is preferably 5-30 mm. Alternatively, the first cutting edge may be a nose cutting edge which is convex in a top view, preferably in the form of a circular arc, having a radius of curvature of 0.2-1.6 mm, and be arranged between, i.e. connecting, a first forward cutting edge, i.e. a main cutting edge or a principal cutting edge or a leading cutting edge, and a first rearward cutting edge, i.e. an auxiliary cutting edge or a trailing cutting edge.

The first top surface may in a top-view alternatively have a rhombic shape, a triangular shape, a square shape or a polygon shape.

The first top surface and the second top surface may each be flat. Alternatively, one or both of said surfaces may be non-flat or nonplanar. Preferably, said surfaces may comprise one or more chip breaking means, in the form of one or more protrusions and/or depressions.

The direction which the first top surface is facing is a normal to the first top surface, i.e. a direction perpendicular to the first top surface. Said direction is away from the first top surface, and away from the first bottom surface, in case the first cutting element is in the form of a cutting insert or a turning insert, having a first bottom surface.

In case the first top surface is non-flat, for the purpose of determine the direction which the first top surface is facing, such first top surface may be defined as or approximated to a plane parallel to a first mid-plane, where said plane intersects the first cutting edge, or at least a portion of the first cutting edge. Said first mid-plane is a plane mid-way between the first top surface and the first bottom surface, in case the first cutting element is in the form of a cutting insert or a turning insert, having a first bottom surface.

Alternatively said first top surface, for the purpose of determine the direction which the first top surface is facing, may be defined as a plane intersecting all nose cutting edges bordering to or adjoining the first top surface.

A corresponding reasoning applies for the second top surface and the second cutting element.

The second cutting element comprises a second nose cutting edge separating and connecting a second forward cutting edge and a second rearward cutting edge. The second cutting element comprises a first top surface. The second top surface comprises a rake face or a rake surface. The second forward cutting edge is a leading cutting edge. The second rearward cutting edge is a trailing cutting edge.

The turning tool is suitable for external turning of a cylindrical metal work piece, such as preferably longitudinal turning. The first and second cutting elements can be alternatively used for longitudinal turning of a metal work piece, which rotates in one direction around a rotational axis thereof.

The first and second cutting elements intersect or are arranged along an imaginary circle or cylinder having a center axis thereof which is parallel to or coinciding with the coupling axis. Preferably, said center axis coincides with or substantially coincides with the coupling axis. Substantially coincides means less than 20 mm from the coupling axis. The first cutting element is inclined in relation to the second cutting element by an inclination angle. Preferably, said inclination angle is at least 45°. Even more preferably, said inclination angle is 180°+/−20°, even more preferably 180°+/−10°. If said inclination angle is 180°, the center axis of the imaginary circle or cylinder is between the first cutting edge and the second nose cutting edge.

The turning tool is arranged for turning of a metal work piece rotatable around a rotational axis thereof, where said rotational axis is parallel to said center axis. The second nose cutting edge is the part of the second cutting element which is closest to the center axis. The first cutting edge is the part of the first cutting element which is closest to the center axis.

The first top surface is inclined in relation to the second top surface by an angle which is equal to said inclination angle or within +/−20° of said inclination angle. If the first top surface and the second top surface both extends radially from the center axis of the imaginary circle, said angle is equal to the inclination angle. Alternatively, the first cutting element and/or the second cutting element may be tilted positively or negatively by an angle of up to 10°. In another alternative, the first top surface and/or the second top surface may be arranged to form a positive or negative rake angle.

The first and second top surfaces facing in the same direction along the imaginary circle, in other words the first and second are either both facing a clock-wise direction or a counter clock-wise direction.

The first top surface is facing in a direction which is perpendicular to or substantially perpendicular, or within 15°, to the coupling axis. Formulated differently, a first assumed direction of primary motion in accordance with ISO 3002-1:1982 of the first cutting element is in a direction which is perpendicular to or substantially perpendicular, i.e. within 15°, to an axis parallel to the coupling axis.

A first tool reference plane in accordance with ISO 3002-1:1982 associated with the first cutting element may be parallel to or may coincide with a second tool reference plane in accordance with ISO 3002-1:1982 associated with the second cutting element. Coincide means that the first and second tool reference planes are in a common plane. The coupling axis preferably extends in said common plane. Alternatively, the coupling axis extends in a plane parallel to said common plane. Alternatively, i.e. if said tool reference planes do not extend in a common plane, the first and second tool reference planes may be at an angle relative to each other, wherein said angle is equal to an angle between a first assumed direction of primary motion of the first cutting element and a second assumed direction of primary motion of the second cutting element. Preferably, the first and second tool reference planes intersect along a line, which line coincides with or is parallel to a rotational axis of a metal work piece to be machined.

The direction which the first top surface is facing and the direction which the second top surface is facing may differ by 180° or substantially 180°, when seen in a front view. In such case, a first assumed direction of primary motion in accordance with ISO 3002-1:1982 of the first cutting element is in a direction which is in the opposite direction to a second assumed direction of primary motion of the second cutting element. Preferably, the direction which the first top surface is facing and the direction which the second top surface is facing differs by at least 40°.

No part of the turning tool is between the first cutting edge and the second nose cutting edge.

The turning tool comprises an intermediate portion, wherein the intermediate portion is longitudinally between the coupling portion and the cutting elements.

The first and second cutting elements preferably overlap longitudinally, where the longitudinal direction is defined by the coupling axis.

The first cutting edge and the second nose cutting edge are free ends. In other words, said cutting edges are positioned such that a metal cutting operation can be performed.

According to an embodiment, the first cutting element comprises a first forward cutting edge and a first rearward cutting edge, wherein the first cutting edge is a first nose cutting edge; wherein the first nose cutting edge separates and connects a first forward cutting edge and a first rearward cutting edge.

By such a turning tool, more complex shapes can be machined. For example, a groove may be machined. The first forward cutting edge, which is a principal cutting edge or a main cutting edge, and the first rearward cutting edge, which is an auxiliary cutting edge, are each preferably straight or linear or substantially straight or substantially linear in a top view. The first nose cutting edge is convex in a top view, preferably in the form of a circular arc, preferably having a radius of curvature of 0.2-1.6 mm.

The nose angle of the first cutting element, defined as the angle between the first forward cutting edge and the first rearward cutting edge, is preferably less than or equal to 160°, even more preferably 30°-80°.

The first forward cutting edge is preferably arranged to form an acute first entering angle, when moving the turning tool in a direction perpendicular to the coupling axis and parallel to a rotational axis of a metal work piece. Preferably said first entering angle is 3-45°, even more preferably 5-30°.

During said moving of the turning tool, the first nose cutting edge and the first forward cutting edge are in cut, i.e. are active.

No part of the turning tool is along a straight line connecting the first and second nose cutting edges.

According to an embodiment, the second nose cutting edge is forward of the first cutting edge measured along the coupling axis.

By such a turning tool, a more complex shape can be machined. For example, a first roughing operation can be performed using one cutting element at low entering angle in longitudinal turning, and remaining material can be removed by the other cutting element.

A distance from the rear end, defined by the coupling portion, to the second nose cutting edge is greater than a distance from the rear end to the first cutting edge, where said distances are measured along lines parallel to the coupling axis. Preferably the difference in distance is at least 1 mm, more preferably 2-30 mm.

According to an embodiment, a first nose angle defined as an angle between the first forward cutting edge and the first rearward cutting edge is acute.

By such a turning tool, more complex shapes can be machined. By such a turning tool, more feed directions are possible, such as e.g. out-facing. The first nose angle is conventionally measured in a top view. Preferably, said first nose angle is 25-80°, even more preferably 30-60°.

According to an embodiment, the turning tool comprises a forward facing surface, wherein at least two elements protrude in the forward direction from the forward facing surface, wherein a first of said protruding elements comprises the first cutting element, wherein a second of said protruding elements comprises the second cutting element.

The turning tool preferably comprise an intermediate portion. Said intermediate portion is longitudinally between the coupling portion and the protruding elements. The intermediate portion comprises the forward facing surface. The forward facing surface is facing in a direction away from the coupling portion.

Each of said protruding elements are preferably connected to the intermediate portion, by one or more clamping means. Said clamping means preferably comprises one or more screws or bolts, each extending along an axis parallel to the coupling axis.

In other words, each of the protruding elements preferably comprises one or more threads, where said thread or threads are in the form of a helix around an axis along an axis parallel to the coupling axis.

Said protruding elements are preferably in the form of replaceable cutting heads, each having an insert seat, wherein a cutting insert or a turning insert is clamped or mounted in said insert seat.

Said intermediate portion preferably extend mainly in a direction perpendicular to the coupling axis.

The intermediate portion connects the at least two forwardly protruding elements with the coupling portion. The forwardly protruding elements protrude in a direction away from the coupling portion and in a direction away from the forward facing surface.

The forwardly protruding elements each have a longitudinal extension, i.e. an extension in a direction parallel to the coupling axis.

The first protruding element comprises the first cutting element. formed on a first protruding element. The second protruding element comprises the second cutting element.

According to an embodiment, the at least two forwardly protruding elements are spaced apart from the coupling axis.

Preferably, the at least two forwardly protruding elements are spaced apart from the coupling axis by the same or substantially the same, i.e. within +/−10%, distance.

According to an embodiment, a second nose angle defined as an angle between the second forward cutting edge and the second rearward cutting edge is acute.

By such a turning tool, more complex shapes can be machined. By such a turning tool, more feed directions are possible, such as e.g. out-facing. The first nose angle is conventionally measured in a top view. Preferably, said second nose angle is 25-80°, even more preferably 30-60°.

According to an embodiment, the first cutting element is in the form of a first turning insert, wherein the second cutting element is in the form of a second turning insert, wherein the first turning insert comprises the first top surface and an opposite first bottom surface, wherein the second turning insert comprises the second top surface and an opposite second bottom surface, wherein the first top surface comprises the first rake surface, wherein the second top surface comprises the second rake surface.

Preferably the first turning insert comprises the first forward cutting edge and the first rearward cutting edge.

top surfaces comprises rake surfaces, bottom surfaces comprises seating surfaces or contact surfaces.

A first through hole for a first screw intersects the first top and first bottom surfaces.

A second through hole for a second screw intersects the second top and first bottom surfaces.

A first mid-plane extends substantially mid-way between the first top surface and the first bottom surface, and a second mid-plane extends substantially mid-way between the second top surface and the second bottom surface. Preferably, the first mid-plane and the second mid-plane extends in parallel or substantially parallel planes.

According to an embodiment, the first cutting element is arranged such that when moving the turning tool in a first direction parallel to the coupling axis the first forward cutting edge forms an first entering angle of 3-45°, wherein the second cutting element is arranged such that when moving the turning tool in a second direction, opposite to the first direction, the second forward cutting edge forms an second entering angle of 3°-45°.

By such a turning tool, the wear can be reduced. The first direction is preferably a forward direction. The second direction is parallel to the coupling axis.

According to an embodiment, the first cutting element is arranged such that when turning in the first direction the first rearward cutting edge forms a first back clearance angle of 93°-135°.

By such a turning tool, the first cutting element can be used in more feed directions, e.g. out-facing. By such a turning tool, more complex shapes can be machined.

According to an embodiment, the second cutting element is arranged such that when turning in the second direction, the second rearward cutting edge forms a second back clearance angle of 93°-135°.

By such a turning tool, the second cutting element can be used in more feed directions, e.g. out-facing. By such a turning tool, more complex shapes can be machined. The second direction is a rearward direction.

According to an embodiment, the first cutting element and the second cutting element are arranged such that when turning in the first direction, the second nose cutting edge is ahead of the first cutting edge.

By such a turning tool, more complex shapes can be machined.

The first and second nose cutting edges are spaced apart longitudinally, where the coupling axis defines a longitudinal axis.

Turning in the first direction in this context means moving the turning tool in a forward direction along the coupling axis. The rear end of the turning tool is defined by the coupling portion.

According to an embodiment, the first cutting element and the second cutting element are arranged such that the first cutting element and the second cutting element can be used for turning a metal work piece rotatable in one direction around a rotational axis thereof, wherein said rotational axis is arranged perpendicular to and intersecting the coupling axis.

The first cutting element and the second cutting element can be alternatively be used for machining, i.e. turning, without any rotation of the turning tool.

According to an embodiment, the turning tool is arranged such that a cylindrical metal work piece can be arranged between the first cutting element and the second cutting element, wherein a longitudinal axis of the metal work piece is between said cutting elements (7, 8).

Preferably, said longitudinal axis is perpendicular to the coupling axis. The said cylindrical metal work piece preferably has a diameter of 16-500 mm, even more preferably 20-200 mm.

According to an embodiment, the coupling portion is square or rectangular in a cross section or comprises a conical or substantially conical portion.

Said cross section is in a plane perpendicular to the coupling axis. The coupling portion preferably comprise a conical or substantially conical portion and a ring-shaped portion, such as preferably in the form of a polygonal hollow taper interface with a flange contact surface, such in accordance to ISO 26623-1:2014, or a hollow taper with a flange contact surface such as in accordance to DIN 69893, ISO 12164-1 or ISO 12164-1F.

The coupling portion is preferably arranged such that it allows quick-change, in other words relatively fast manual or automatic clamping and removal. Preferably, the coupling portion is arranged without thread. Preferably, the coupling portion is arranged without or with less than three screw holes or bolt holes or location pin holes.

The coupling portion may have a square or rectangular shape in a cross section, where said cross section is in a plane perpendicular to the coupling axis. In such a case, the coupling portion preferably has a length of 50-300 mm, measured along the coupling axis. If the coupling portion is square, i.e. square shaped, in a cross section, the sides of the square are preferably 20 mm, 25 mm, 25.4 mm or 32 mm.

The coupling portion is arranged to be connected to e.g. a turret or a tool post or a tool holder.

The coupling portion is preferably a known coupling portion. Therefore, the turning tool can be used on CNC-lathes of known types. In other words, the CNC-lathe does not have to be purpose built or modified to use the turning tool.

According to an embodiment, a turning method for a CNC-lathe comprises the steps of: providing a metal work piece, providing a turning tool as described above, rotating the metal work piece in one direction around a rotational axis thereof, moving the turning tool in a first direction such that the first cutting edge is in cut, moving the turning tool in a direction such that the first cutting edge is moved away from the metal work piece and such that the second nose cutting edge is moved towards the metal work piece, moving the turning tool in a second direction such that the second forward cutting edge is in cut at a second entering angle which is 5-45°, wherein the second direction is in the opposite direction or substantially opposite direction to the first direction.

The turning method is for a CNC-lathe i.e. a computer- or computerized numerical control lathe, i.e. any CNC-machine suitable for turning such as e.g. a turning lathe, a multitask machine, a turn-mill machine, or a sliding head machine. A metal work piece is provided. The metal work piece comprises an external surface, which is a radially outer surface. The radially outer surface is facing away from the rotational axis. The turning method is for turning of the radially outer surface, i.e. external turning. The metal work piece extends between a first end and a second end. The metal work piece is clamped by clamping means. The clamping means holds the metal work piece and are at least partially controlled and driven by a motor or a spindle.

The clamping means may be in the form of a collet chuck, a face driver, a 3-jaw chuck, and may comprise a tail stock. The headstock end of the machine is preferably located at the first end of the metal work piece. A second end of the metal work piece, opposite to the first end of the work piece, may be a free end. Alternatively, the second end is in contact with a tailstock.

The method comprises the step of rotating the metal work piece in one direction around a rotational axis thereof. The one direction may be clock-wise or counter clock-wise. Said rotational axis is parallel to the center axis of the imaginary circle or cylinder.

The method includes the step of moving the turning tool in a first direction, i.e. in a first feed direction. The first direction may preferably be parallel to the rotational axis, also known as longitudinal turning. Said step is included in a first pass, which is defined as between going into cut and going out of cut. The first pass is not necessarily a movement of the first cutting element along a straight line. When turning in the first direction, the first cutting edge is in cut. A machined surface is formed by the first cutting edge.

Preferably, the first cutting element comprises a first forward cutting edge and a first rearward cutting edge, wherein the first nose cutting edge separating and connecting the first forward cutting edge and the first rearward cutting edge, wherein when turning in the first direction the first forward cutting edge forms an acute first entering angle.

After or during going out of cut, the turning tool is moved such that the first cutting edge is moved away from the metal work piece and such that the second nose cutting edge is moved towards the metal work piece. During at least a portion of said movement, neither the first cutting element nor the second cutting element is in cut, i.e. no metal cutting by the first and second cutting elements during said movement.

Said movement of the turning tool is preferably a linear movement, i.e. the turning tool is moved linearly. Said movement of the turning tool may is preferably in a direction perpendicular to the coupling axis and perpendicular to the rotational axis.

The method includes the step of turning in a second direction. The second direction is in the opposite direction or substantially opposite to the first direction. For example, the first direction and second direction may be parallel to the rotational axis, but in opposite directions. Said step is included in a second pass, which is defined as between going into cut and going out of cut. The second pass is not necessarily a movement of the first cutting element along a straight line. A machined surface is formed by the second nose cutting edge. The second nose cutting edge and the second forward cutting edge is in cut, such that the second forward cutting edge is in cut at a second entering angle which is 5°-45°, even more preferably 5°-30°.

The second cutting element is inactive when turning in the first direction. The first cutting element is inactive when turning in the second direction.

Preferably, the method comprises the step of setting the coupling axis parallel to the rotational axis.

Preferably, the second direction is in the opposite direction or substantially opposite to the first direction.

Preferably, the method comprises the further step of setting a first entering for the first forward cutting edge to be acute, preferably 3°-45°, even more preferably 5°-30°, wherein when turning in the first direction. Said first direction is parallel to the rotational axis. Preferably, the second forward cutting edge is in cut at a second entering angle which is acute, preferably 5°-45°, when turning in the second direction.

During the second pass, the second rearward cutting edge preferably forms an obtuse back clearance angle. Preferably, said back clearance angle is 91°-135°, even more preferably 93°-120°.

During the first pass, the first rearward cutting edge preferably forms a back clearance angle of at least 91°.

Preferably, the step of moving the turning tool such that the first cutting edge is moved away from the metal work piece and such that the second nose cutting edge is moved towards the metal work piece is a linear motion. Said linear motion is preferably in a direction perpendicular to the coupling axis.

Preferably the step of moving the turning tool such that the first cutting edge is moved away from the metal work piece and such that the second nose cutting edge is moved towards the metal work piece is without rotation of the turning tool around the coupling axis. By this, the indexing time can be shorter, compared to a rotational movement.

Preferably, the turning tool does not rotate around the coupling axis during the first pass, the second pass or between the first and second passes. Preferably, the turning tool does not rotate around any other axis, such as any axis parallel to the coupling axis, during or between the first and second passes.

Preferably the method comprises the step of during the second pass, turning at least a portion of a surface machined or turned during the first pass.

Preferably the method comprises the further step of arranging the first and second nose cutting edges such that said nose cutting edges are spaced apart along the rotational axis by a constant distance during all steps of the method.

Preferably the method comprises the further step of setting the coupling axis parallel to the rotational axis.

Preferably the method comprises the step of clamping the metal work piece by means of a collet chock, wherein the metal work piece is a bar having a diameter of less than or equal to 50 mm.

Preferably a distance from the clamping means to the second nose cutting edge is shorter than a distance from the clamping means to the first cutting edge.

Preferably, the second nose cutting edge is ahead of the first cutting edge during the first pass. Preferably, the first cutting edge is ahead of the second nose cutting edge during the second pass.

Ahead is to be understood as ahead in the feed direction, along the rotational axis.

Preferably the second pass is in a direction away from a corner. A corner, or a shoulder, is defined as the intersection between a first surface concentric with the rotational axis, and a second surface perpendicular to the rotational axis. The first surface may be an external surface or an internal surface, i.e. a surface inside a bore. Preferably, the first surface is an external surface, i.e. a radially external surface.

Preferably the second direction is in a direction away from an external corner of the metal work piece. Preferably said corner is at least partly formed by the second cutting element. Said corner, or shoulder, is defined as the intersection between a first surface concentric with the rotational axis, and a second surface perpendicular to the rotational axis.)

According to an embodiment, a computer program has instructions which when executed by a CNC-lathe causes the CNC-lathe to perform the steps according to the above described method.

Said computer program, or computer program product, may be included in a CAM-software product, i.e. a software for computer-aided manufacturing. Said computer program may be in the form a computer readable medium such as a USB-stick, a CD-ROM or a data stream.

DESCRIPTION OF THE DRAWINGS

The present invention will now be explained in more detail by a description of embodiments of the invention and by reference to the accompanying drawings.

FIG. 1 is a perspective view of a turning tool according to an embodiment.

FIG. 2 is a top view of the turning tool in FIG. 1.

FIG. 3 is a front view of the turning tool in FIG. 1.

FIG. 4 is a side view of the turning tool in FIG. 1.

FIG. 5 is a top view of the turning tool in FIG. 1 and a metal work piece.

Figure 6:
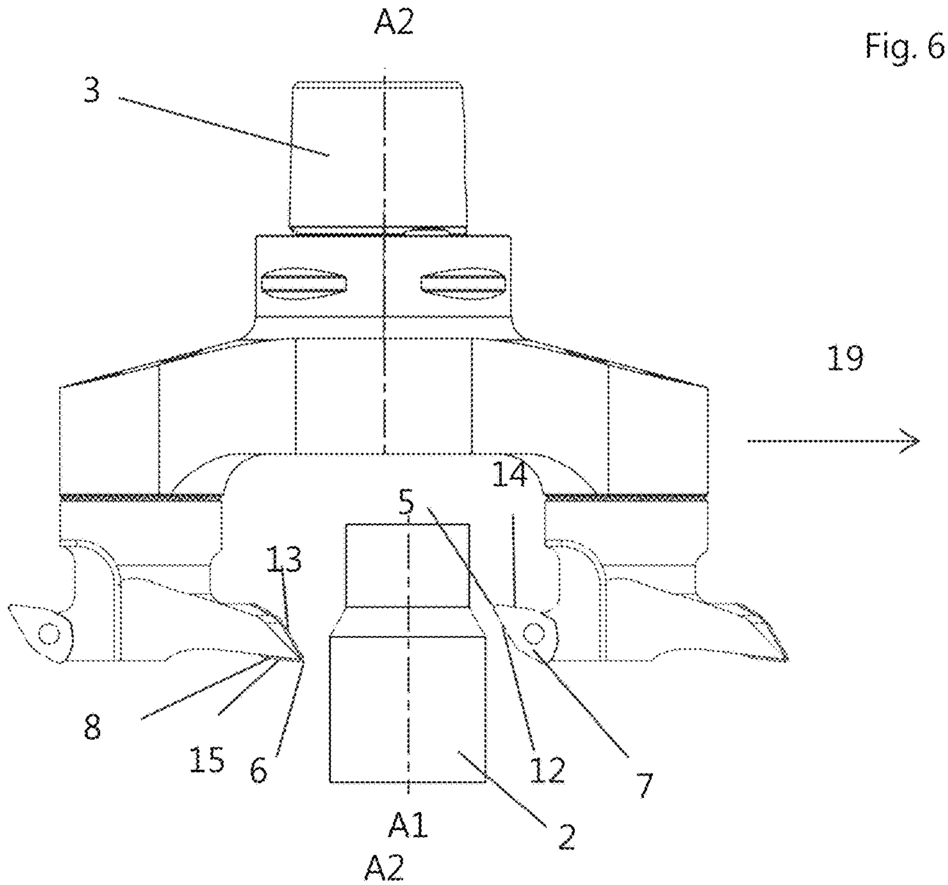
FIG. 6 is a further top view of the turning tool in FIG. 1 and a metal work piece.

All turning tools in the figures are drawn to scale.

DETAILED DESCRIPTION OF EMBODIMENTS OF THE INVENTION

Reference is now to FIGS. 1-7 which show a turning tool 1 according to an embodiment. The turning tool 1 comprising a coupling portion 3. The coupling portion 3 extends along a coupling axis A2, defining a longitudinal axis of the turning tool 1. The coupling portion defines the rear end of the turning tool 1. The turning tool 1 comprises a first cutting element 7 in the form of a first turning insert 7 and a second cutting element 8 in the form of a second turning insert 8. As seen in e.g. FIG. 2 the first turning insert 7 comprises a first forward cutting edge 12, a first rearward cutting edge 14 and a first nose cutting edge 5. The first nose cutting edge 5 is the part of the first turning insert 7 which is closest to the coupling axis A2. The second turning insert 8 comprises a second nose cutting edge 6, a second forward cutting edge 13 and a second rearward cutting edge 15. A first nose angle defined as an angle between the first forward cutting edge 12 and the first rearward cutting edge 14 is acute. A second nose angle defined as an angle between the second forward cutting edge 13 and the second rearward cutting edge 15 is acute.

As seen in e.g. FIG. 2, measured along or parallel to the coupling axis A2, the second nose cutting edge 6 is forward of the first cutting edge 5. Forward is defined as away from the coupling portion 3, towards the first and second turning inserts 7, 8.

As seen in e.g. FIG. 3, the first turning insert 7 comprises a first top surface 20 and an opposite first bottom surface. The second turning insert 8 comprises a second top surface 21 and an opposite second bottom surface. The first top surface 20 comprises a first rake surface, and the second top surface 21 comprises a second rake surface. As seen in FIG. 3 the first and second cutting inserts 7, 8 intersect an imaginary circle or cylinder C1 having a center axis A3 thereof which parallel to the coupling axis A2. The first turning insert 7 is inclined in relation to the second turning insert 8 by an inclination angle ω, where said inclination angle ω is measured around the center axis A3 of the imaginary circle C1. The first top surface 20 is facing in a direction which is perpendicular to or substantially perpendicular to the coupling axis.

As seen in e.g. FIG. 1, the turning tool 1 comprises a forward facing surface 42, i.e. a surface facing away from the coupling portion 3. Two elements 30, 31 in the form of replaceable cutting heads 30, 31 which protrude in the forward direction from the forward facing surface 42. The first cutting head 30 comprises the first turning insert 7, meaning that the first cutting head comprises an insert seat in which the first turning insert 7 is mounted. The second cutting head 31 comprises the second cutting element 8. The cutting heads 30, 31 are spaced apart from the coupling axis A2.

The coupling portion 3 defines the rear end of the turning tool 1 and is suitable for being inserted into a machine interface (not shown) which preferably comprise a cavity or a recess (not shown). The coupling portion 3 shown in e.g. FIG. 1 comprises a substantially conical or substantially tapered or tapered portion. The coupling portion is in the field of metal cutting tools known as Coromant Capto®. Other types of coupling portions are possible, for example such known as square shank types. For example, if the coupling portion is of the square shank type, the cross section of the coupling portion, perpendicular to the coupling axis, is square shaped or rectangular shaped. Further, for such a turning tool, the coupling axis is parallel to and 5-20 mm below the coupling axis A2 in FIG. 4.

FIG. 5 shows a first machining step. A metal work piece 2 rotates in one direction around a rotational axis A1 thereof. The turning tool 1 is moved in a first direction 17 parallel to the coupling axis A2 and parallel to a rotational axis A1 of a metal work piece 2 thereof. The first direction 17 is a forward direction, i.e. in a direction away from the coupling portion 3 and in the direction which the forward facing surface 42 is facing. The top surface of the first turning insert 7 is facing the viewer in FIG. 5. A machined surface is formed by the first nose cutting edge 5, in other words the first nose cutting edge 5 is a surface generating cutting edge.

The first turning insert 7 is arranged such that the first forward cutting edge 12 forms an acute first entering angle α of 3-45°. The first rearward cutting edge 14 forms an obtuse first back clearance angle γ of 93°-135°. The second turning insert 8 is spaced apart from the metal work piece 2. When moving the turning tool 1 in the first direction 17, the second nose cutting edge 6 is ahead of the first nose cutting edge 5. As seen in FIG. 5, the turning tool 1 is arranged such that the metal work piece 2, which is cylindrical, is arranged between the first turning insert 7 and the second turning insert 8, wherein the rotational axis A1 which is a longitudinal axis A1 of the metal work piece (2) is between said turning inserts 7, 8.

FIG. 6 shows a step after the step shown in FIG. 5. The turning tool 1 is moved in a direction 19 such that the first nose cutting edge 5 is moved away from the metal work piece 2 and such that the second nose cutting edge 6 is moved towards the metal work piece 2. The turning tool 1 is moved in a direction 19 which is perpendicular to the coupling axis A2 and perpendicular to the rotational axis A1. Said movement is a linear movement.

Figure 7:
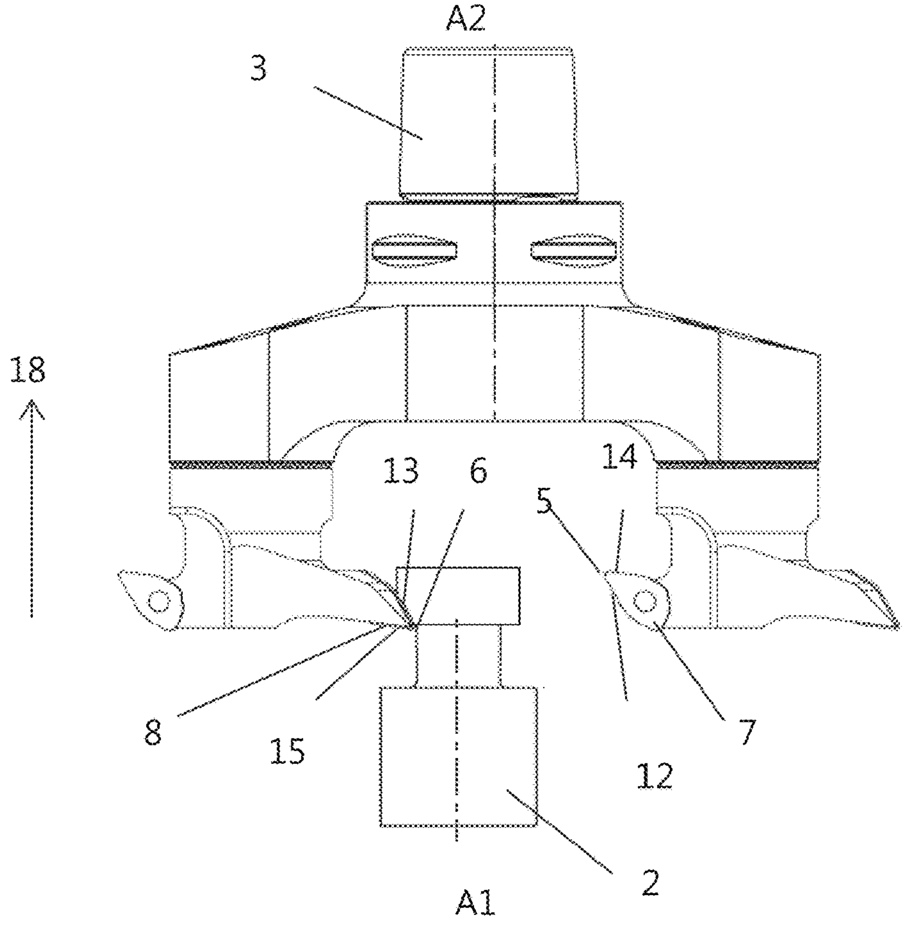
FIG. 7 is yet a top view of the turning tool in FIG. 1 and a metal work piece.

FIG. 7 shows a step which is after the step shown in FIG. 6. The turning tool 18 is moved in a second direction 18. The second direction 18 is in the opposite direction to the first direction 17. The second forward cutting edge 13 forms an acute second entering angle β of 3°-45°. The second rearward cutting edge 15 forms an obtuse second back clearance angle δ of 93°-135°. The first turning insert 7 is spaced apart from the metal work piece 2. The first nose cutting edge 5 is ahead of the second nose cutting edge 6 in the second direction 18. At least a portion of the surface machined by the first turning insert 7 in the first step, showed in FIG. 5, is machined by the second turning insert 8.

Figure 8:
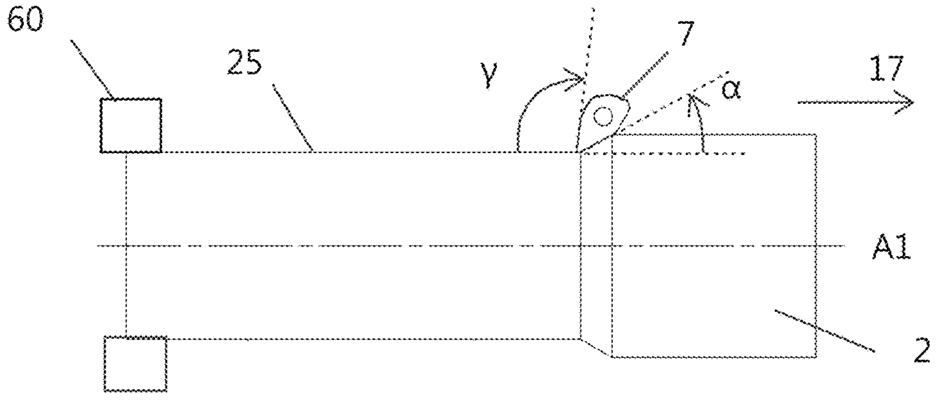
FIG. 8 is a schematic figure of moving a turning tool in a first direction.

FIG. 8 show an example of a first step of a turning method for a CNC-lathe (not shown). A metal work piece 2 is rotating in one direction 50 around a rotational axis A1 thereof. The coupling portion 3 of the turning tool 1 is connected to the CNC-lathe (not shown), more specifically the coupling portion is connected to a machine interface. The coupling axis A2 is perpendicular to the rotational axis A1. The turning tool 1 is moved in a first direction 17 such that the first nose cutting edge 5 is in cut and such that the first forward cutting edge forms an acute entering angle. The first rearward cutting edge 14 forms an obtuse back clearance angle. The second and third turning inserts 8, 9 are spaced apart from the metal work piece 2. The second nose cutting edge is ahead of the first nose cutting edge 5 in the first direction 17. The first direction is parallel to the rotational axis A1.

The metal work piece can have a different shape compared to what has been described above. The metal work piece may be in the form of a bar, a hollow bar or any other shape which has a rotational symmetry or substantially has a rotationally symmetry around a rotational axis thereof. The shape which can be machined can be of different configurations than what have been described above. For example, the shape can have not only one but two side walls, i.e. surfaces which is in a plane perpendicular to the rotational axis. In other words, the turning tool can be used to machine an external groove.

FIG. 8 is a schematic figure of moving a turning tool in a first direction 17 where the first cutting element 7 is in cut. The first direction 17 is a feed direction. The first forward cutting edge forms a first entering angle α which is 5-45°, and the first rearward cutting edge forms an obtuse back clearance angle γ of at least 91°. The second cutting element 8 is spaced apart from the metal work piece 2. A machined surface 25 is formed by the first cutting element 7. More specifically, the surface 25 is formed by the first nose cutting edge 5.

Figure 9:
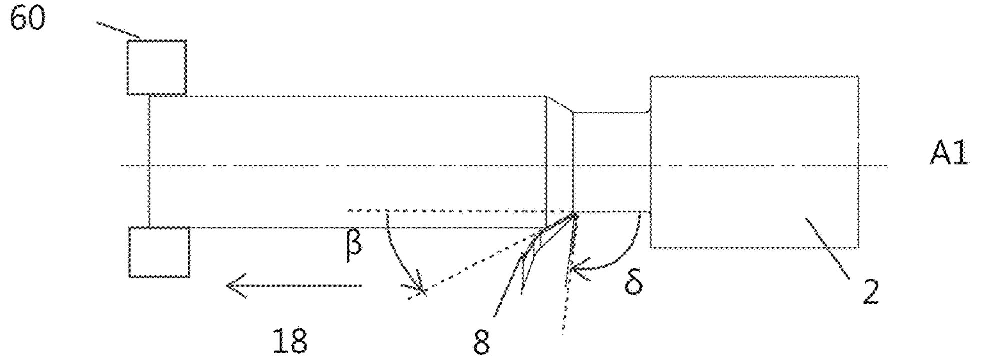
FIG. 9 is a further schematic figure of moving a turning tool in a second direction.

FIG. 9 is a further schematic figure of moving a turning tool in a second direction 18 where the second cutting element 8 is in cut. The second forward cutting edge is in cut at a second entering angle β which is 5-45°, and the second rearward cutting edge forms an obtuse back clearance angle δ. The second bottom surface is facing the viewer.

FIG. 8 show a first machining step, which can be followed by a step showed in FIG. 9. In FIG. 9, the second cutting element 8 is on the opposite side of the rotational axis A1 as the first cutting element 7 in FIG. 8, and the first top surface is facing the opposite direction as the second top surface.

The metal work piece 2 in FIGS. 8-9 is clamped by clamping means 60 at one end. Said clamping means 60 are connected to and driven by a rotating or rotatable spindle (not shown), which are part of a CNC-lathe (not shown). Said clamping means may be in the form of e.g. a collet chuck, a 3-jaw chuck or a face driver. A distance from the clamping means 60 to the second nose cutting edge 6 is shorter than a distance from the clamping means 60 to the first cutting edge 5, where said distances are measured along lines parallel to the rotational axis A1. In FIGS. 24-26, the first direction 17 is away from the clamping means 60, and the second direction 18 is towards the clamping means. Alternatively (not shown), the first direction 17 is towards the clamping means 60, and the second direction 18 is away from the clamping means. The first and second directions 17, 18 are thus in opposite directions along the rotational axis A1. Opposite directions can thus be understood as towards or away from the clamping means or towards or away from one longitudinal end of the metal work piece. The first and second directions are thus not necessarily linear and parallel to the rotational axis.

FIG. 9 show how the second direction 18 is in a direction away from a corner of the metal work piece 2. In other words, the second direction 18 is in a direction away from a surface which is in a plane perpendicular to the rotational axis A1. Said corner, or a shoulder, is the intersection between a surface concentric with the rotational axis, and a second surface perpendicular to the rotational axis. Said corner is a 90° corner. Said corner is preferably completely formed by the second cutting element, where the turning tool is moved towards the rotational axis A1, immediately prior to moving the turning tool in the second direction 18.

Figure 10:
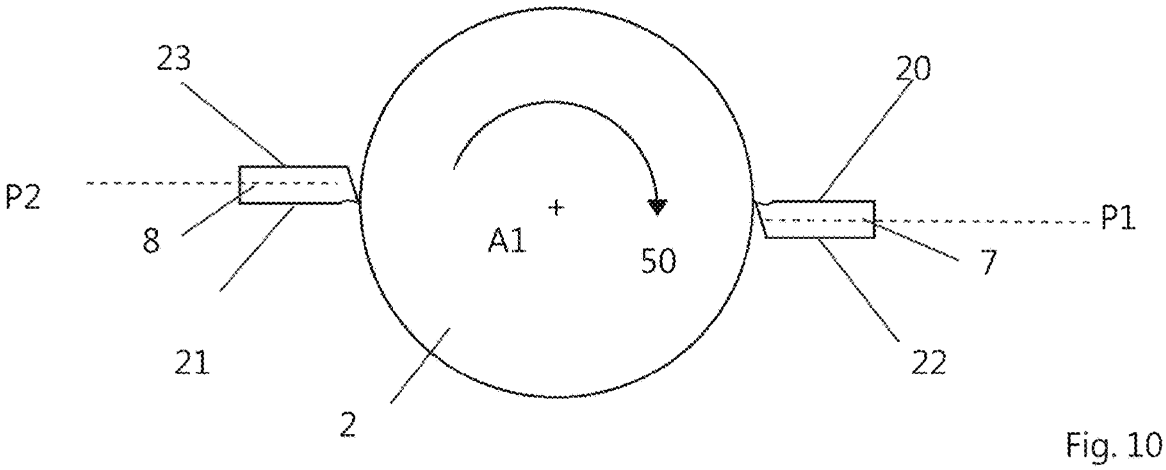
FIG. 10 is a schematic figure showing a first cutting element, a second cutting element and a rotating metal work piece in a cross section.

FIG. 10 is a schematic figure showing a first cutting element 7 in the form of a first turning insert 7, a second cutting element 8 in the form of a second turning insert 8 and a rotating metal work piece in a cross section. The first and second turning inserts 7, 8 are arranged according to the above described embodiment. The first turning insert 7 comprises a first top surface 20 and a first bottom surface 22, both are horizontal or substantially horizontal. The second cutting insert 8 comprises second top surface 21 and a second bottom surface 23, both are horizontal or substantially horizontal. A first mid plane P1 is mid-way or substantially mid-way between the first top surface 20 and the first bottom surface 22. The first midplane P1 is parallel to or substantially parallel to the first bottom surface 22. The second mid plane P2 is arranged in a corresponding manner. The first and second mid planes P1, P2 are arranged in parallel planes. The metal work piece 2 rotates in one direction 50 around a rotational axis A1 thereof. The first and second turning inserts 7, 8 are located on opposite sides of the rotational axis A1. The first top surface 20 is facing upwards in the figure, and the second top surface 21 is facing downwards in the figure. When the first turning insert 7 is in cut, the second turning insert 8 is spaced apart from the metal work piece 2.

The first and second turning inserts 7, 8 are preferably made from a wear resistant material, preferably cemented carbide. The first and second top surfaces 20, 21 preferably comprises chip forming means or chip breaking means (not shown). Preferably, a distance from at least a portion of said chip forming means or chip breaking means to the mid-plane of the respective turning insert is greater than a distance from the cutting edge bordering to the top surface to said mid-plane. In other words, the top surfaces 20, 21 of the first and second turning inserts comprises at least one protrusion, which in a side view is higher than or above the cutting edge. In such a way, the turning inserts are more suitable for turning.

The first and second turning inserts 7, 8 are preferably designed such that the first forward cutting edge 12 is sloping downwards, i.e. towards the first bottom surface 22, at increasing distance from the first nose cutting edge 5. The second forward cutting edge 13 is preferably arranged in a corresponding manner. In such a way, the chip control is further improved.

The forward and rearward cutting edges are forward and rearward in the respective feed directions, not necessarily forward or rearward in relation to forward or rearward directions of the turning tool itself.

The invention claimed is:

1. A turning tool comprising:

a coupling portion, wherein the coupling portion extends along a coupling axis, the coupling axis defining a longitudinal axis of the turning tool; and a first cutting element and a second cutting element, wherein the first cutting element includes a first cutting edge, a first forward cutting edge and a first rearward cutting edge, wherein the second cutting element includes a second nose cutting edge which separates and connects a second forward cutting edge and a second rearward cutting edge, wherein the second forward cutting edge is forward of the second rearward cutting edge in a direction away from the coupling portion, wherein the first cutting element includes a first top surface, wherein the second cutting element includes a second top surface, wherein the first and second cutting elements intersect an imaginary circle having a center axis thereof parallel to or coinciding with the coupling axis, wherein the first cutting element is inclined in relation to the second cutting element by an inclination angle, wherein said inclination angle is measured around the center axis of the imaginary circle, and wherein the first top surface is facing in a direction which is perpendicular to or substantially perpendicular to the coupling axis, wherein the first cutting element is arranged such that as the turning tool is moved in a first direction parallel to the coupling axis the first forward cutting edge forms a first entering angle of 3-45°, and wherein the second cutting element is arranged such that as the turning tool is moved in a second direction, opposite to the first direction, the second forward cutting edge forms a second entering angle of 3°-45°, wherein the turning tool is arranged to be moved linearly in a direction perpendicular to the coupling axis such that the first cutting edge is moved away from a metal work piece and such that the second nose cutting edge is moved towards the metal work piece, and wherein indexing from the first cutting element to the second cutting element is achieved by the linear movement of the turning tool.

2. The turning tool according to claim 1, wherein the first cutting edge is a first nose cutting edge, and wherein the first nose cutting edge separates and connects the first forward cutting edge and the first rearward cutting edge.

3. The turning tool according to claim 2, wherein, measured along the coupling axis, the second nose cutting edge is forward of the first cutting edge in a direction away from the coupling portion.

4. The turning tool according to claim 2, wherein a first nose angle, defined as an angle between the first forward cutting edge and the first rearward cutting edge, is acute.

5. The turning tool according to claim 1, wherein the turning tool includes a forward facing surface facing away from the coupling portion, wherein at least two elements protrude in the forward direction from the forward facing surface, wherein a first of said protruding elements includes the first cutting element, and wherein a second of said protruding elements includes the second cutting element.

6. The turning tool according to claim 5, wherein the at least two forwardly protruding elements are spaced apart from the coupling axis.

7. The turning tool according to claim 1, wherein a second nose angle, defined as an angle between the second forward cutting edge and the second rearward cutting edge, is acute.

8. The turning tool according to claim 1, wherein the first cutting element is in the form of a first turning insert, wherein the second cutting element is in the form of a second turning insert, wherein the first turning insert includes the first top surface and an opposite first bottom surface, wherein the second turning insert includes the second top surface and an opposite second bottom surface, wherein the first top surface includes the first rake surface, and wherein the second top surface includes the second rake surface.

9. The turning tool according to claim 1, wherein the first cutting element is arranged such that as the first cutting element is moved in the first direction the first rearward cutting edge forms a first back clearance angle of 93°-135°.

10. The turning tool according to claim 9, wherein the second cutting element is arranged such that as the second cutting element is turned in the second direction, the second rearward cutting edge forms a second back clearance angle of 93°-135°.

11. The turning tool according to claim 1, wherein the first cutting element and the second cutting element are arranged such that as the turning tool is turned in the first direction, the second nose cutting edge is ahead of the first cutting edge.

12. The turning tool according to claim 1, wherein the first cutting element and the second cutting element are arranged such that the first cutting element and the second cutting element are arranged for turning a metal work piece rotatable in one direction around a rotational axis thereof, wherein said rotational axis is arranged perpendicular to and intersecting the coupling axis.

13. The turning tool according to claim 1, wherein the turning tool is arranged such that a cylindrical metal work piece is arranged between the first cutting element and the second cutting element, and wherein a longitudinal axis of the metal work piece is between said cutting elements.

14. The turning tool according to claim 1, wherein the coupling portion is square or rectangular in a cross section or includes a conical or substantially conical portion.

15. A turning method for a CNC-lathe, comprising the steps of:

providing a metal work piece;

providing a turning tool according to claim 1;

rotating the metal work piece in one direction around a rotational axis thereof;

moving the turning tool in a first direction such that the first cutting edge is in cut;

moving the turning tool in a direction such that the first cutting edge is moved away from the metal work piece and such that the second nose cutting edge is moved towards the metal work piece; and moving the turning tool in the second direction such that the second forward cutting edge is in cut at the second entering angle which is 5-45°, wherein the second direction is in the opposite direction or substantially opposite direction to the first direction.

16. A computer program having instructions, which when executed by a CNC-lathe, causes the CNC-lathe to perform the steps according to claim 15.

17. The turning tool according to claim 1, wherein, after or during going out of cut of the first cutting edge, the turning tool is arranged to be moved such that the first cutting edge is moved away from the metal work piece and the second nose cutting edge is moved towards the metal work piece, wherein during at least a portion of said movement neither the first cutting element nor the second cutting element is in cut, and wherein said movement is the linear movement in a direction perpendicular to the coupling axis.

* * * * *